United States Patent [19]
Oliveti

[11] 3,782,005
[45] Jan. 1, 1974

[54] AUDIO-VISUAL TEACHING SYSTEM CONSISTING OF A SELF PROPELLING MAGNETIC READING UNIT, SLIDING ALONG MAGNETIC TRACKS PRE-RECORDED ON PAGED SHEETS

[75] Inventor: Alessandro Oliveti, Rome, Italy

[73] Assignee: Soc. S.A.M.E.R., Rome, Italy

[22] Filed: Oct. 4, 1971

[21] Appl. No.: 186,185

[30] Foreign Application Priority Data
Oct. 14, 1970 Italy .............................. 54027 A/70

[52] U.S. Cl. ............ 35/8 A, 35/35 C, 179/100.2 T, 274/4 J
[51] Int. Cl. .......................... G09b 5/04, G11b 5/80
[58] Field of Search ........................... 35/8 A, 35 C; 274/4 J; 179/100.2 HT

[56] References Cited
UNITED STATES PATENTS

| | | | |
|---|---|---|---|
| 2,936,342 | 5/1960 | Kallmann | 35/35 C X |
| 3,343,281 | 9/1967 | Greer, Jr. et al. | 35/35 C |
| 2,548,011 | 4/1951 | Frost | 35/35 C |
| 2,822,425 | 2/1958 | Hicks | 35/8 A X |
| 3,609,885 | 10/1971 | Bram | 35/35 C |

Primary Examiner—Wm. H. Grieb
Attorney—Irvin S. Thompson et al.

[57] ABSTRACT

An audio-visual teaching system for rendering easier the learning of scholastic matters at any level, wherein the support of the information and/or the images consists of illustrative sheets suitably paged and the sound reproduction is obtained by a self propelling magnetic reading unit slidable with a precisely constant speed along a pre-recorded magnetic track, secured to the paged illustrative sheet.

3 Claims, 5 Drawing Figures

PATENTED JAN 1 1974                                              3,782,005

AUDIO-VISUAL TEACHING SYSTEM CONSISTING OF A SELF PROPELLING MAGNETIC READING UNIT, SLIDING ALONG MAGNETIC TRACKS PRE-RECORDED ON PAGED SHEETS

The object of the present invention is an audio-visual didactic aid for facilitating instruction at all levels.

It is known to augment instruction with audio-visual didactic aids.

In fact, the association of the image with the sound, or the immediate checking in a positive or negative sense, which are characteristics of these systems, together with the fact that the knowledge can be supplied repeatedly in the same modes, will facilitate instruction thereby remarkably shortening the learning and teaching times.

Also it must be added that the audio-visual aid carries out a particular function stimulating and enhancing the innate curiosity of the person using the machine, so as to make easy the learning of the matter which is thereby taught. This observation allows one to apply the immense possibilities offered by these systems to the pre-school teaching, of children generally, who still cannot adequately develop their mental capacities in this first and delicate period of formation, due to lack of knowledge of how the matter must be presented in a way suitable for their interests and capacities.

Accordingly, one of the purposes of the present invention is that of giving the child also a device having an intrinsic interest besides the aspect of a toy and which can be caused to operate for educational purposes.

In the embodiments known up to now, these teaching means are embodied in complicated devices, requiring the use of coils of magnetic tapers or paper, of very elaborate mechanical systems for their display, of recording devices and so on, so that their use is in no way easy and practical, and this without mentioning the serious drawback due to the impossibility of quickly selecting the choosen instructional material.

According to the present invention, the audio-visual teaching system consists of a set of illustrative sheets, paged so as to obtain an album or volume each of said sheets containing two or more frames illustrated and separated by suitable guides provided in the direction of the greatest dimension, along said guides a magnetic track being provided, whereon is recorded an explanation or other sound information concerning the above illustration.

In order to facilitate the utilization of the sheets, these are located on a suitable stand on which are located also an audio amplifier, the electric supply in direct current, and an on-off switch.

The transduction of the sound information recorded on the aforesaid magnetic track into words is obtained by means of a magnetic reading self-propelling unit, which by means of the traction motor with which it is provided, starts sliding along the magnetic track located on the lower edge of the selected illustration when said unit is manually located thereon and simultaneously the device is fed by connecting it to the feeding source.

Among the purposes of the present invention there is also that of supplying the child with a device having, besides its intrinsic interest, also the form of a toy, and to this end the magnetic reading self propelling unit can have an outer shape corresponding to the appearance of a Mickey Mouse, of a Donald Duck or the like in order to have a greater attraction.

Each illustrative sheet consists of a rectangular support suitable to receive, by known processes, the imprint of graphs, drawings, illustrations, within two or more frames separated from one another by as many sliding guide systems located along the greatest dimension of the support itself; in one preferred embodiment of this invention, the guide system consists of a rectangular window located along the greatest dimension of the illustrative sheet or support, immediately below each illustration.

The upper edge of each window which is located immediately below and parallel to the lowest margin of the frame containing the illustration, the graph and/or the drawing, and is parallel to said margin, is provided with a magnetic track obtained either by depositing a thin layer of iron oxides by known methods, or applying thereon a length of tape for magnetic recording. Then on each track will be recorded the sound information or the explanation necessary to illustrate or to characterize the above graphical part. The illustrative sheets, gathered in albums or volumes, are utilized by placing them on a suitable stand, where by means of a self propelling magnetic reading unit, slidable by its own means along the pre-recorded track, the previously recorded sound information can be reproduced. The magnetic reading unit consists of a metal plate the edge of which is partly raised and cardioid-like shaped.

To the metal plate is rigidly connected a direct-current-operated traction motor the spindle of which, acting by friction on a fly-wheel provided with pins, rotates said fly-wheel causing the plate to move forward, to said plate being mechanically connected the reading head, the magnetic governor for the forward speed, and the multicore cable leading to the direct current feeding source and the audio-amplifier located on the stand, which allows the sound information read-out from the scanned magnetic track to be heard at the required level of accoustic power. The reading can be effected or repeated at will, by moving the magnetic reading unit to the begin of the selected track corresponding to the single illustration, graph or drawing contained in any illustrative sheet and this in a merely manual way. By closing the feeding circuit, the propelling motor for the reading unit will be fed, and accordingly said unit will start sliding along the selected magnetic track, stopping at its end by the effect of a limit switch. Meanwhile the reading head supplies a signal to the final audio amplifier contained within the stand, whereby it is possible to hear the information or the explanation concerned with the selected illustration.

A magnetic device for adjusting the forward speed, operating according to known physical principles, renders the transfer movement of the reading head absolutely constant and independent from the possible irregularities of the illustrative sheets or the sliding guides.

The reading magnetic head is also provided with spring and adjusting devices and with counterweights in order to ensure the necessary pressure on the scanned magnetic track in order to obtain a correct reproduction.

IN THE DRAWING

Figure 2:
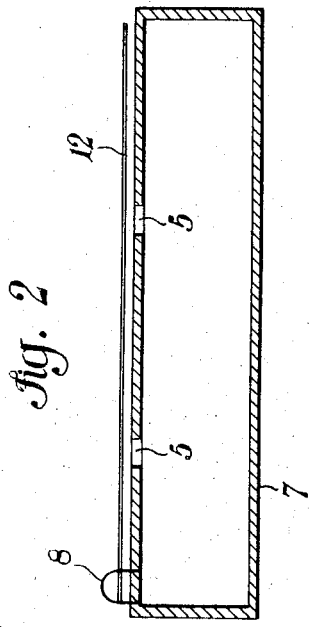
FIGS. 2 and 3 show a stand, in cross sectional view and in plan view, respectively.
Figure 1:
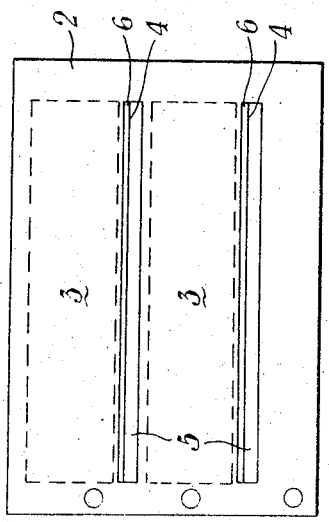
FIG. 1 shows one of the illustrated sheets forming a volume or album seen in top plan view.
Figure 3:
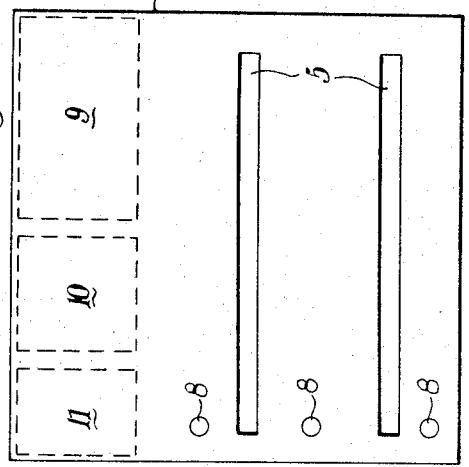

With reference to FIG. 1, and by way of non limitative example, according to the present invention, each sheet 2 consists of a flat reactangular support suitable to receive by known processes, the imprint of graphs, drawings, illustrations, within two or more frames 3—3, separated by a system of sliding guides, consisting in one preferred embodiment of this invention of a rectangular window 5 obtained by cutting in an appropriate way the support itself. The upper edge 4 of the window 5 is provided with a magnetic track 6 obtained either by deposition by known processes and methods of a thin layer of iron oxide, or by application of a length of a magnetic tape of a type known per se. On the magnetic track 6, information or other sound suitable to illustrate the above graphic part 3—3 will be recorded. With reference to FIGS. 2 and 3, the stand 7 consists of a body of light material through the surface of which are provided the windows 5—5; according to a preferred embodiment of this invention, there are also the rings 8, better shown in the cross-sectional view of FIG. 2, which hold in place the sheet 12, denoted by the numeral 2 in FIG. 1. An audio low frequency amplifier 9 is disposed within stand 7, while the reference numeral 10 denotes the casing for the battery of cells, and the numeral 11 denotes the casing for the magnetic reading self propelling unit, when the device is not utilized.

Figure 4:
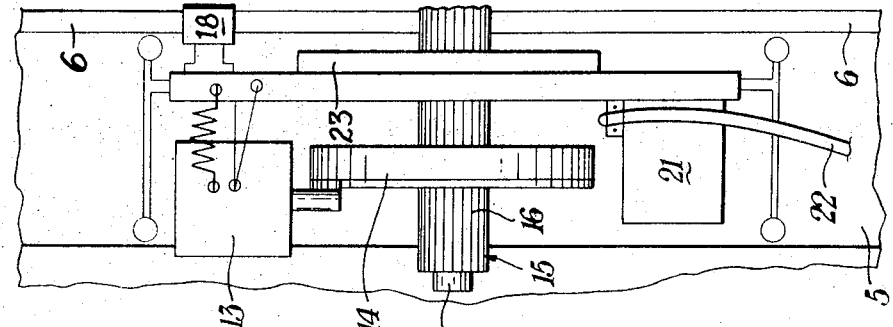
FIG. 4 shows the magnetic reading self propelling unit in a general plan view.
Figure 5:
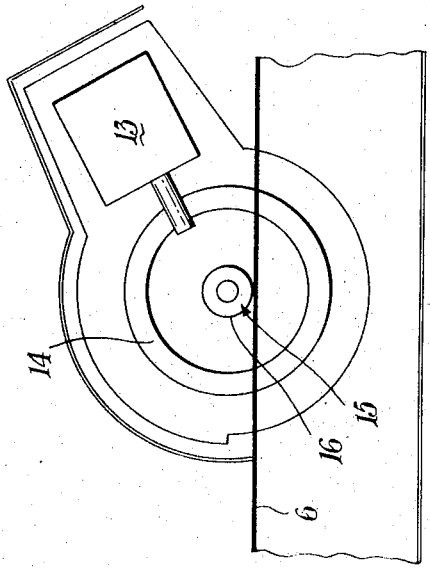
FIG. 5 shows the reading propelling unit, the outer casing of which can be shaped to represent toys.

With refernce to FIG. 4, also according to the present invention, any only by way of non limitative example, the self propelling magnetic reading unit includes a motor 13, operated by direct current, which operates by friction the fly-wheel 14 rigid with the roller 15 coated with rubber 16 and free to move about the spindle 17 thereby rolling on the edges of the groove 5 to cause the reading head 18 to move forward along the magnetic track 6 in order to detect the sound information recorded thereon.

The direct current operated motor 21 forms the magnetic system for compensating the forward speed of the self propelling unit which, through the multicore cable 22 is connected to the direct current feeding source and to the power audio amplifier, both located in the stand 7 shown in FIG. 3. The described reproducing device is suitably weighted by the member 23 in order to obtain a suitable pressure of the reading head 18 on the magnetic track 6 this being essential for an undistorted reproduction.

By the arrangement acc ording to the present invention, it has been possible to obtain the advantage of a quick selection of the sound information concerned with the desired point, due to the fact that the magnetic reading head can be immediately manually carried to the desired point. Finally, by the contrivance of the system of the magnetic compensation of the forward speed, any cause of distortion has been removed, if due to streatching of the magnetic tapes during the recordal or the read-out, while the feeding by cell batteries or little re-loadable accumulators, ensures the greatest ease of operation and immediate use in any circumstance.

Having thus described the present invention, what is claimed is:

1. In an audio-visual teaching device for reproducing sound from a magnetic sound track on a sheet, including a stand for sheets to be read having on its upper face a plurality of elongated parallel slots, battery means in said stand for powering said device, and an audio low frequency amplifier in said stand ; the improvement comprising a self-propelling pickup unit movable along said upper face and having an electric motor connected to said battery means, a roller that rolls on the upper sides of the edges of said slots on a horizontal axis, a flywheel coaxial with said roller and of a diameter greater than said roller, said flywheel descending into one of said slots, means drivingly interconnecting said motor and said roller and flywheel, said pickup unit having a pickup that moves along magnetic sound tracks on sheets lying on said upper face, and means electrically connecting said pickup to said amplifier.

2. A device as claimed in claim 1, and a counterweight on said pickup unit to attain a suitable pressure of said pickup on a said sound track.

3. A device as claimed in claim 1, and a magnetic governor for controlling the speed of said motor.

* * * * *